United States Patent
Kabir

(10) Patent No.: US 9,611,936 B2
(45) Date of Patent: Apr. 4, 2017

(54) PISTON ROD CLAMPING SYSTEM

(71) Applicant: GE Oil & Gas Compression System, LLC, Houston, TX (US)

(72) Inventor: Omar M. Kabir, Waller, TX (US)

(73) Assignee: GE Oil & Gas Compression Systems, LLC, Houston, TX (US)

( * ) Notice: Subject to any disclaimer, the term of this patent is extended or adjusted under 35 U.S.C. 154(b) by 567 days.

(21) Appl. No.: 14/076,079

(22) Filed: Nov. 8, 2013

(65) Prior Publication Data

US 2014/0130662 A1 May 15, 2014

Related U.S. Application Data

(63) Continuation-in-part of application No. 13/674,925, filed on Nov. 12, 2012.

(51) Int. Cl.
*F16J 1/00* (2006.01)
*F16J 7/00* (2006.01)
*F16J 1/01* (2006.01)

(52) U.S. Cl.
CPC ............... *F16J 7/00* (2013.01); *F16J 1/006* (2013.01); *F16J 1/01* (2013.01)

(58) Field of Classification Search
CPC ........ F16J 7/00; F16J 1/01; F16J 1/005; F16J 1/006; F16J 1/001; F16J 1/12; F02F 3/0015; F02F 3/0023; F02F 3/0076; F02F 2003/0007
USPC ... 92/172, 212, 246, 224, 249, 254, 258, 59, 92/165 R, 201, 202, 203, 204, 205, 206, 92/207, 255, 256, 257
See application file for complete search history.

(56) References Cited

U.S. PATENT DOCUMENTS

| | | | | |
|---|---|---|---|---|
| 499,064 | A * | 6/1893 | Vauclain | F16J 1/12 29/898.059 |
| D940,068 | | 11/1909 | Robinson | |
| 1,355,519 | A * | 10/1920 | Wagner | F16J 1/005 92/206 |
| 1,388,254 | A * | 8/1921 | Hansen | F04B 53/143 92/240 |
| 2,460,948 | A * | 2/1949 | Sander | F04B 53/143 92/258 |
| 2,793,089 | A * | 5/1957 | Anderson | F04B 39/042 277/434 |
| 3,074,769 | A | 1/1963 | Fahlman et al. | |
| 3,149,543 | A | 9/1964 | Naab | |

(Continued)

FOREIGN PATENT DOCUMENTS

GB 2174730 A 11/1986

OTHER PUBLICATIONS

PCT Search Report and Written Opinion issued in connection with related PCT Application No. PCT/US2013/065994 on Feb. 17, 2014.

(Continued)

*Primary Examiner* — Michael Leslie
*Assistant Examiner* — Dustin T Nguyen
(74) *Attorney, Agent, or Firm* — Mintz Levin Cohn Ferris Glovsky and Popeo, P.C.

(57) ABSTRACT

A system, in certain embodiments, includes a piston clamping system including a piston rod comprising a piston rod shoulder and a piston rod nut coupled to the piston rod, wherein the piston rod nut and the piston rod shoulder are configured to axially capture first and second body portions of a piston therebetween.

15 Claims, 7 Drawing Sheets

(56) References Cited

U.S. PATENT DOCUMENTS

| | | | | |
|---|---|---|---|---|
| 3,155,014 | A | * | 11/1964 | Genz .......................... F16J 1/02 |
| | | | | 92/158 |
| 3,636,824 | A | * | 1/1972 | Clark ....................... F16J 1/006 |
| | | | | 277/468 |
| 3,930,472 | A | | 1/1976 | Athenstaedt |
| 4,008,051 | A | | 2/1977 | Cadle |
| 4,073,221 | A | * | 2/1978 | Goloff .................. F02F 3/0023 |
| | | | | 92/220 |
| 4,306,489 | A | | 12/1981 | Driver et al. |
| 4,683,810 | A | | 8/1987 | Afimiwala |
| 5,052,275 | A | * | 10/1991 | Mayer .................. F04B 53/147 |
| | | | | 74/471 R |
| 5,284,084 | A | | 2/1994 | Pippert et al. |
| 5,878,652 | A | * | 3/1999 | Kottke ..................... F16J 1/006 |
| | | | | 92/172 |
| 6,199,369 | B1 | | 3/2001 | Meyer |
| 6,675,699 | B1 | * | 1/2004 | Pippert ................. F04B 53/143 |
| | | | | 92/254 |
| 2002/0018725 | A1 | | 2/2002 | Ota et al. |
| 2010/0206553 | A1 | * | 8/2010 | Bailey .................. E21B 17/042 |
| | | | | 166/244.1 |
| 2010/0307446 | A1 | | 12/2010 | Nodl |

OTHER PUBLICATIONS

US Office Action issued in connection with related U.S. Appl. No. 13/674,925 on Mar. 2, 2015.
US Office Action issued in connection with related U.S. Appl. No. 13/674,925 on Sep. 28, 2015.
PCT International Search Report and Written Opinion for PCT/2013/069507 mailed Feb. 17, 2014.
Australian Search Report issued in connection with corresponding AU Application No. 2013342092 on Jul. 21, 2016.

* cited by examiner

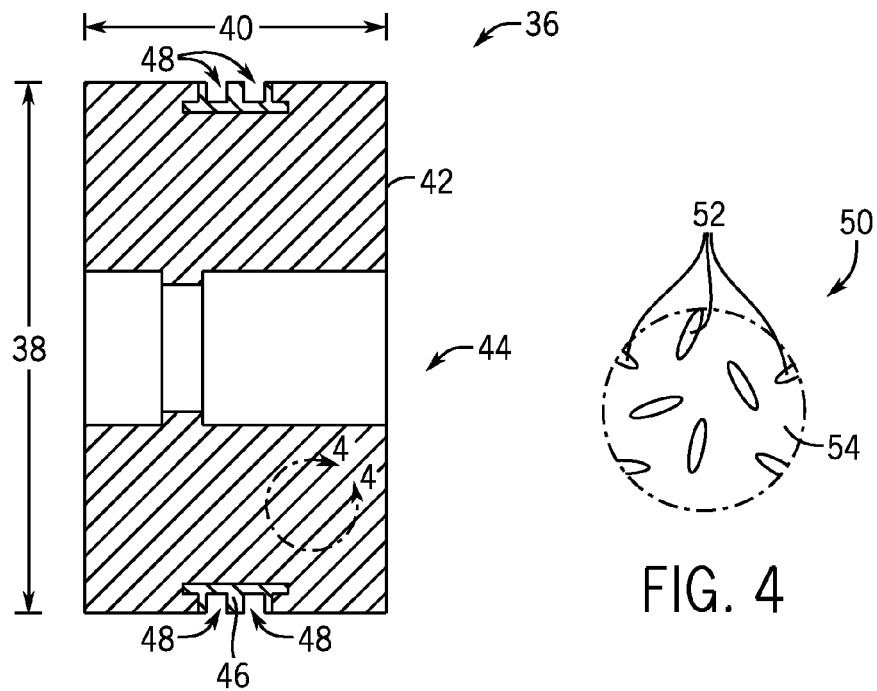
FIG. 3
FIG. 4
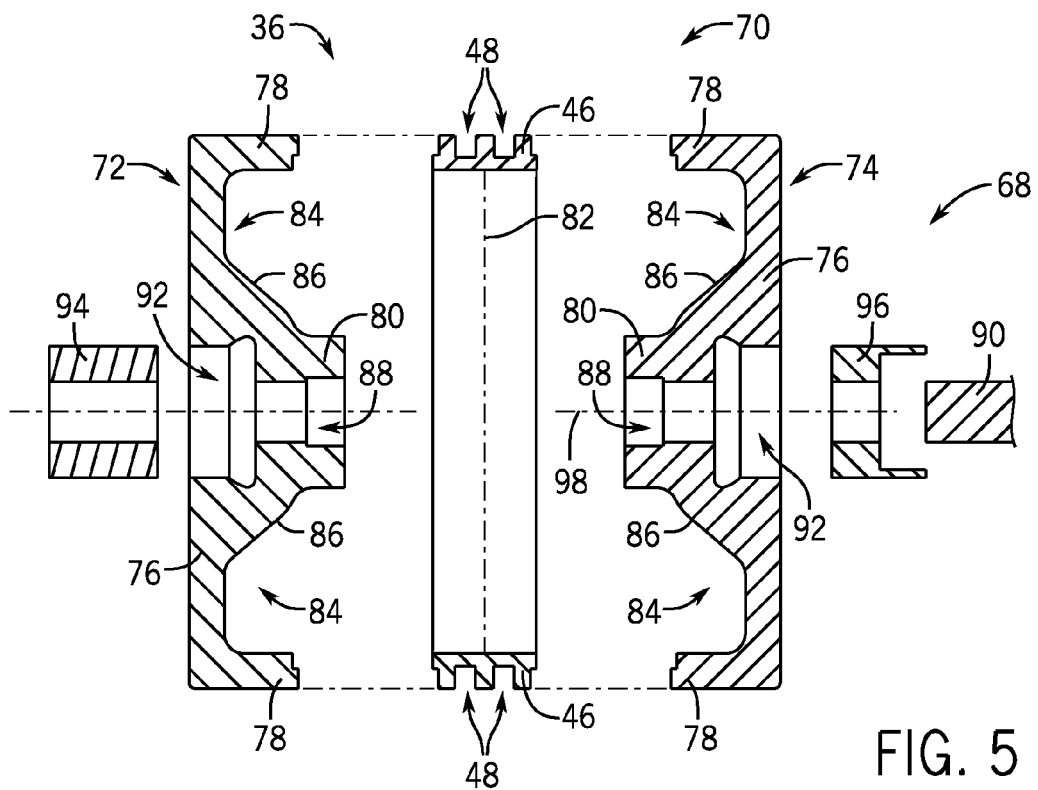
FIG. 5

US 9,611,936 B2

PISTON ROD CLAMPING SYSTEM

CROSS-REFERENCE TO RELATED APPLICATIONS

This application claims priority to and benefit of U.S. Non-Provisional patent application Ser. No. 13/674,925, entitled "LIGHT COMPOSITE PISTON", filed Nov. 12, 2012.

BACKGROUND

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

A piston may include a disk or cylinder that moves within a close-fitting cylinder of a mechanical assembly. The piston within the cylinder operates to transfer force from a working fluid to a shaft, or vice versa. The piston may include a crosshead designed to reduce or eliminate lateral, or radial, pressure on the piston during operation. For example, mechanical assemblies such as engines, pumps, and compressors include cylinders with reciprocating pistons. In engines, the piston moves in response to a fluid pressure resulting from combustion of a fuel-oxidant mixture. More specifically, the force from the fluid pressure is transferred to the piston, which further transfers the force to a shaft. Conversely, pumps and compressors include pistons for compressing or ejecting a fluid within a respective cylinder. The pump or compressor includes a shaft which transfers force from a connecting rod, a crosshead, a piston rod, and the piston to a working fluid, such that the working fluid is compressed within or displaced from the cylinder. Unfortunately, the speed of the piston and crosshead, and therefore the flow capacity of the mechanical assembly, may be limited by the construction of the piston.

BRIEF DESCRIPTION OF THE DRAWINGS

Various features, aspects, and advantages of the present invention will become better understood when the following detailed description is read with reference to the accompanying figures in which like characters represent like parts throughout the figures, wherein:

FIG. 3 is a cross-sectional side view of a light composite piston, in accordance with embodiments of the present disclosure;

FIG. 4 is a partial cross-sectional view taken within line 4-4 of FIG. 3, illustrating an embodiment of the composite material having a reinforcing material distributed within a matrix material;

FIG. 5 is an exploded view of a light composite piston assembly, in accordance with embodiments of the present disclosure;

DETAILED DESCRIPTION OF SPECIFIC EMBODIMENTS

Figure 1:
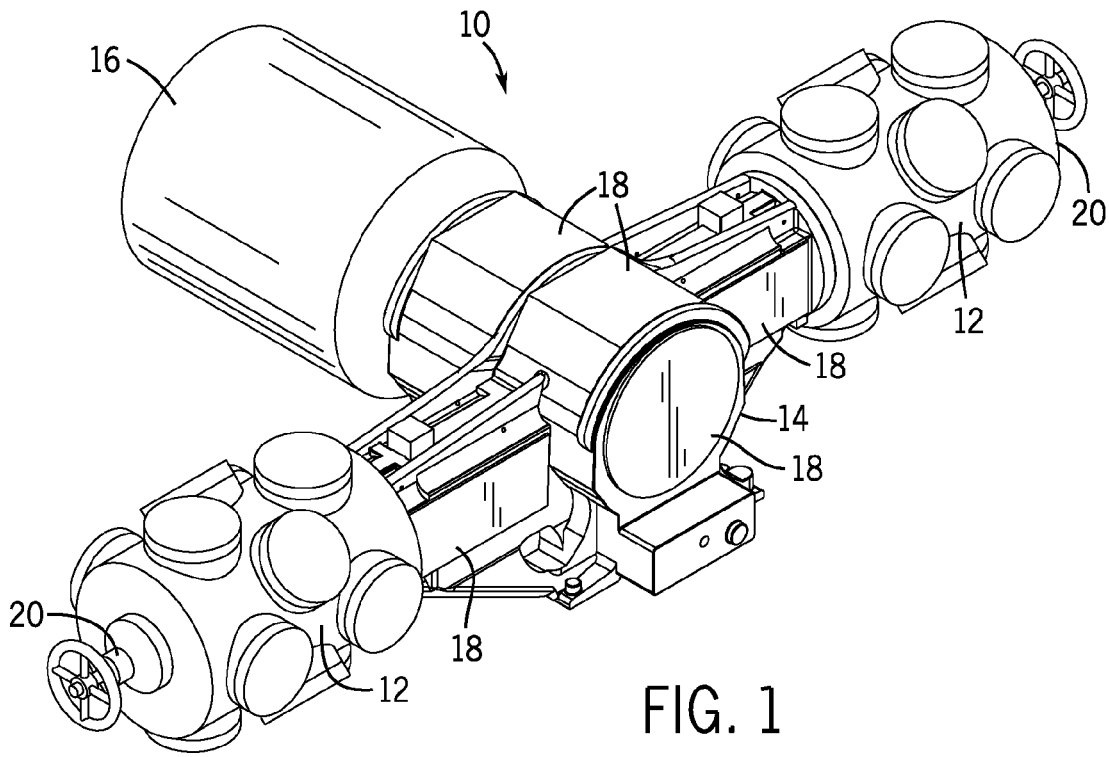
FIG. 1 is a perspective view of a reciprocating compressor including a light composite crosshead and/or a light composite piston in accordance embodiments of the present disclosure.

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Moreover, the use of "top," "bottom," "above," "below," and variations of these terms is made for convenience, but does not require any particular orientation of the components.

Certain embodiments of the present disclosure include a piston constructed of a lightweight composite material or other lightweight material. For example, the lightweight composite material may be a material formed from a matrix material and a reinforcing material. For example, the reinforcing material may include particles, fibers, or the like, distributed throughout the matrix material. In other embodiments, the lightweight composite material may include metal components, non-metal components, and/or ceramic composite components. The piston may be configured for use in a reciprocating compressor, engine, pump, or the like. In certain embodiments, the lightweight composite piston may have a single piece design or a multi-piece design. In embodiments of the lightweight composite piston having a multi-piece design, the piston may comprise two or more hollow piston halves or rings, each having one or more internal stiffening ribs configured to increase strength of the piston. Embodiments of the lightweight composite piston further include a piston ring carrier configured to receive and support a piston ring. As will be appreciated, a piston ring (e.g., pressure ring) may serve to provide a gas-tight seal between the piston and the piston cylinder as the piston moves within the piston cylinder (e.g., during a compression stroke). Additionally, certain embodiments may include a piston rod constructed of a composite material. As discussed in detail below, the lightweight composite piston, rod, and associated components may be constructed from a variety of lightweight materials. Advantageously, the lightweight material construction of the piston and rod allows the piston to be operated at higher speeds and/or enables larger sized pistons and larger fluid capacity/delivery for the same weight as pistons and cylinders of conventional design. In the case of higher speed, the compressor, pump, engine, or other machine operating the piston may realize a larger fluid flow capacity without increasing the size of the piston cylinder. It should be noted that the disclosed embodiments are described in the context of a compressor. However, other machines may include the disclosed embodiments, such as a combustion engine, pump, or other reciprocating machine.

Certain embodiments of the present disclosure include a piston rod clamping system configured to assemble components of a piston assembly having a multi-piece configuration. In certain embodiments, the piston rod, on the piston side of a piston assembly may be designed to clamp the piston assembly together. For example, a piston rod nut and the piston rod may each have threads that engage with one another to secure the piston rod nut to the piston rod on a first side (e.g., first axial side) of the piston assembly. The piston rod may also have a shoulder or flange disposed on a second side (e.g., second axial side) of the piston assembly. As the piston rod nut is threaded onto the piston rod, the piston rod nut and the collar, flange, or shoulder of the piston rod may approach one another on opposite sides of the piston assembly, thereby axially compressing the components of the piston assembly together and assembling the piston assembly.

Additionally, certain embodiments of the present disclosure include a crosshead constructed of a lightweight composite material or other lightweight material. For example, the lightweight composite material may be a material formed from a matrix material (e.g., a ceramic material) and a reinforcing material (e.g., particles or fibers distributed throughout the matrix material). In other embodiments, the lightweight composite material may include metal components and non-metal components. The crosshead may be configured for use in a reciprocating compressor, engine, pump, or the like. In certain embodiments, the light composite crosshead may also include a crosshead pin made of a light composite material. Embodiments of the light composite crosshead pin may be configured to act as a bearing surface between the crosshead and a connecting rod. Specifically, the light composite crosshead pin may be configured to supply oil or other lubricant to crosshead, pin, and crankshaft surfaces. As discussed in detail below, the lightweight composite crosshead may be constructed from a variety of lightweight materials. Advantageously, the lightweight material construction of the crosshead allows the crosshead to be operated at higher speeds. In this manner, the compressor, pump, engine, or other machine operating the crosshead may realize a larger flow capacity without increasing the size of the piston cylinder. Additionally, the lightweight construction may provide additional benefits, as discussed below.

Furthermore, certain embodiments of the present disclosure include a crosshead lubrication system for a crosshead in a mechanical assembly, such as a compressor, engine, pump, or the like. For example, the crosshead lubrication system may include a crosshead and a crosshead pin (e.g., an annular crosshead pin) configured to receive a flow of a lubricant, such as oil, from a connecting rod and flow the lubricant to exterior or outer surfaces of the crosshead. For example, in one embodiment, the lubricant may flow from the connecting rod towards the crosshead and enter an annulus of the crosshead pin through entry ports. Thereafter, the lubricant may pass through exit ports of the crosshead pin and into lubricant ports of the crosshead. In this manner, the lubricant may reduce friction, abrasion, and/or wear between the crosshead and the crosshead pin. Moreover, the lubricant further flows through the lubricant ports of the crosshead, which extend from the crosshead pin (e.g., at an interior of the crosshead) to an exterior of the crosshead. More specifically, the lubricant ports of the crosshead extend to recesses formed in exterior or outer surfaces of the crosshead. As discussed in detail below, the outer surfaces of the crosshead translate along crosshead guides of the mechanical assembly (e.g., compressor). Consequently, as the lubricant exits the lubricant ports and flows within the recesses formed in the exterior surfaces of the crosshead, the lubricant may reduce friction, abrasion, and/or wear between the crosshead and crosshead shoes and/or the crosshead guides as the crosshead moves within the mechanical assembly. In certain embodiments of the lightweight crosshead and crosshead pin, certain composite materials may be used to form the crosshead and the crosshead pin that may reduce the quantity of lubricant used due to a self-lubricating capacity or quality of such composite materials.

Turning now to the figures, FIG. 1 is a perspective view of an exemplary compressor 10. In the illustrated embodiment, the compressor 10 includes a pair of compression cylinders 12 coupled to a frame 14. A variety of internal components may be disposed within the cylinders 12 and the frame 14 to enable compression of fluids introduced into the compressor 10. For example, as discussed in greater detail below, the cylinders 12 may include a crosshead formed from a composite material. In one embodiment, the compressor 10 may be utilized to compress natural gas. However, in other embodiments, the compressor 10 may be configured and/or utilized to compress other fluids.

A mechanical power source or driver 16, such as an engine or an electric motor, is coupled to the compressor 10 to provide mechanical power to the various internal components and enable compression of the fluid within the cylinders 12. To facilitate access to such internal components, as may be desired for diagnostic or maintenance purposes, openings in the frame 14 may be provided and selectively accessed via removable covers 18. Further, the cylinders 12 also include valve assemblies 20 for controlling flow of the fluid through the cylinders 12.

Although the exemplary compressor 10 shown is a two-throw reciprocating compressor, other compressors 10 may have alternative configurations. For instance, in other embodiments, the compressor 10 may include a different number of cylinder throws, such as a four-throw compressor, a six-throw compressor, a couple-free reciprocating compressor, a screw compressor, or the like. Further, other variations in the compressor 10 may include variations in the length of stroke, the operating speed, and the size, to name a few.

Figure 2:
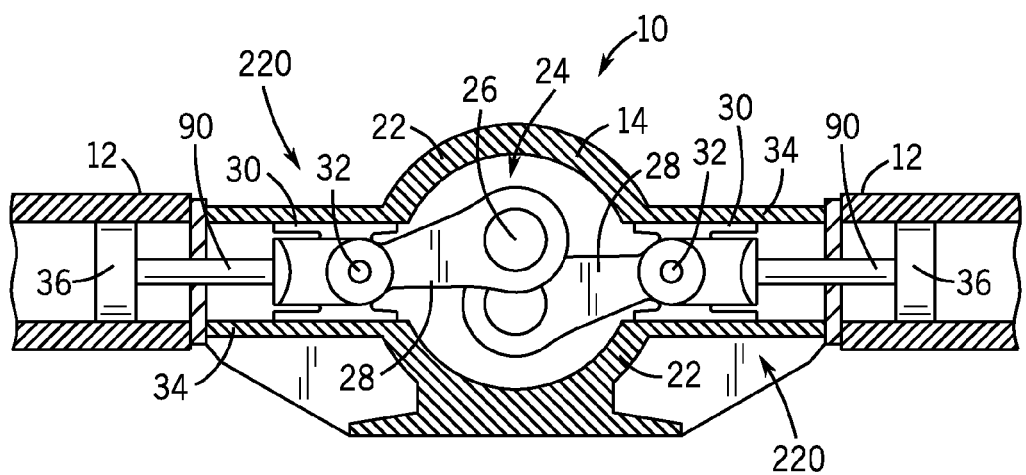
FIG. 2 is an axial cross-sectional view of the exemplary compressor of FIG. 1, including a light composite crosshead and/or a light composite piston, in accordance with embodiments of the present disclosure.

FIG. 2 is a cross-sectional view of the compressor 10, which illustrates a number of exemplary internal components of the compressor of FIG. 1. In the illustrated embodiment, the frame 14 of the compressor 10 includes a hollow central body or housing 22 that generally defines an interior volume 24 in which various internal components may be received, such as a crankshaft 26. In one embodiment, the central body 22 may have a generally curved or cylindrical shape. It should be noted, however, that the central body 22 may have other shapes or configurations.

In operation, the driver 16 rotates the crankshaft 26 supported within the interior volume 24 of the frame 14. In one embodiment, the crankshaft 26 is coupled to crossheads 30 via connecting rods 28 and crosshead pins 32. The crossheads 30 further couple to piston rods 90 via crosshead nuts. The crossheads 30 are disposed within crosshead guides 34, which generally extend from the central body 22 and facilitate connection of the cylinders 12 to the compressor 10. In one embodiment, the compressor 10 includes two crosshead guides 34 that extend generally perpendicularly from opposite sides of the central body or housing 22, although other configurations are also envisaged. As will be appreciated, the rotational motion of the crankshaft 26 is translated via the connecting rods 28 to reciprocal linear motion of the crossheads 30 within the crosshead guides 34.

As discussed in further detail below, the crossheads 30 may have a lightweight construction. More specifically, certain components of the crossheads 30 may be formed from a lightweight composite material. As will be appreciated, the lightweight construction of the crossheads 30 may enable an designer or operator to increase the speed of the compressor 10, thereby increasing the flow capacity of the compressor 10. Furthermore, the increased flow capacity of the compressor 10 with crossheads 30 formed from a composite material may be realized without increasing the size of the cylinders 12 of the compressor 10. As discussed below, the pins 32 of the crossheads 30 may also be made from a light composite material.

Furthermore, certain embodiments of the crossheads 30 and the pins 32 may include a crosshead lubrication system 220. For example, the crossheads 30 and the pins 32 may have features which enable the crossheads 30 and pins 32 to function as the crosshead lubrication system 220. More specifically, the crosshead lubrication system 220 is configured to route oil or other lubricant to bearing surfaces between the crossheads 30, connecting rods 28, and crosshead guides 34, crosshead shoes, and so forth. In this manner, friction, abrasion, and wear may be further reduced within the compressor 10. Additionally, friction, abrasion, and wear may be further reduced within the compressor 10 due to material characteristics of composite materials used to form various components of the compressor 10.

As noted above, the cylinders 12 are configured to receive a fluid for compression. The crossheads 32 are coupled to pistons 36 disposed within the cylinders 12, and the reciprocating motion of the crossheads allows compression of fluid within the cylinders 12 via the pistons 36. Particularly, as a piston 36 is driven forward during a compression stroke (i.e., outwardly from central body 22 into a cylinder 12) the piston 36 compresses the fluid within the cylinder into a smaller volume, thereby increasing the pressure of the fluid. A discharge valve of valve assembly 20 may then be opened to allow the pressurized or compressed fluid to exit the cylinder 12. The piston 36 may then stroke backward, and additional fluid may enter the cylinder 12 through an inlet valve of the valve assembly 20 for compression in the same manner described above.

FIG. 3 is a cross-sectional side view of an exemplary piston 36, which may also be formed from a lightweight composite material or other lightweight material. In the illustrated embodiment, the piston 36 has a generally cylindrical shape, with a diameter 38 and a height 40 (e.g., axial length). Furthermore, the piston 36 has a single piece design. In other words, the piston 36 is formed from a single composite body 42 constructed from a lightweight composite material or other lightweight material. As mentioned above, the composite material may include a matrix material and a reinforcing material. For example, the lightweight composite material may be a carbon composite, a fiberglass composite, or other lightweight composite material. Additionally, other lightweight materials may be used, such as a plastic, a ceramic, a polyimide, a polyetheretherketone (PEEK), an elastomer such as SA4, or other lightweight materials. The composite and/or lightweight construction of the piston 36 may prevent the piston 36 from undergoing material corrosion due to corrosive gases that the piston 36 may contact. For certain applications, the lightweight composite material or other lightweight material may be configured to withstand a greater pressure than conventional compressor design materials. For example, lightweight composite materials may be configured to withstand pressures greater than a minimum radial pressure of approximately 100 to 500, 150 to 450, 200 to 400, or 300 to 350 MPa. Additionally, the piston 36 may be configured for minimal diametrical expansion at a maximum operating temperature. In other words, the piston 36 may be constructed from a lightweight composite material or other lightweight material that may limit the expansion of the diameter 38 of the piston at a specified temperature. For example, the lightweight composite material or other lightweight material may be selected such that the piston 36 undergoes diametrical expansion of less than approximately 0.001 to 0.003, 0.0015 to 0.0025, or 0.0018 to 0.0022 mm at a temperature of approximately 150 to 200, 160 to 190, or 170 to 180 degrees C.

Furthermore, a variety of processes may be used to form the single composite body 42 of the piston 36. In certain embodiments, the single composite body 42 may be compressed, molded, or machined. As shown, the single composite body 42 of the piston 36 includes a bore 44. As with the single composite body 42, the bore 44 may be formed using a variety of processes. For example, in embodiments where the single composite body 42 is molded, the mold used to form the single composite body 42 may be configured to form the bore 44 during the molding process. Alternatively, in embodiments where the single composite body 42 is machined, the bore 44 may be formed by a machining process such as drilling. The bore 44 is configured to receive a piston connecting rod to couple the piston 36 to the crankshaft.

The piston 36 also includes a piston ring carrier 46 configured to receive one or more piston rings. As will be appreciated, pistons rings disposed within the piston ring carrier 46 serve to create a gas-tight connection when the piston 36 is disposed within a piston cylinder. The piston ring carrier 46 may be formed from a metal, such as steel. In the illustrated embodiment, the piston ring carrier 46 includes two annular grooves 48, where each groove 48 is configured to receive a single piston ring. In other embodiments the piston ring carrier 46 may include 1, 3, 4, 5, or more grooves 48. The single composite body 42 and the piston ring carrier 48 are integrally formed. For example, for a piston 36 formed by a molding process, the piston ring carrier 48 may be placed in a mold used to form the piston 36. Thereafter, the lightweight composite material or other lightweight material is poured into the mold, and the lightweight composite material or other lightweight material molds with the piston ring carrier 48 to create the integrally formed piston 36.

FIG. 4 is a partial cross-sectional view, taken within line 4-4 of FIG. 3, illustrating an embodiment of a composite material 50 having a reinforcing material 52 distributed within a matrix material 54. As shown, the matrix material 54 is a base material that holds the reinforcing material 52. In other words, the matrix material 54 surrounds and supports the reinforcing material 52. For example, the matrix material may be a plastic, polymer, polyester, epoxy, polyimide, polyetheretherketone (PEEK), polypropylene, or other matrix material. The reinforcing material 52 is distributed throughout the matrix material 54 and may serve to enhance the physical and/or mechanical properties of the composite material 50. For example, the reinforcing material may be fibers or other particles, such as carbon, glass, ceramics, or other reinforcing material. As will be appreciated, the ratio of matrix material 54 to reinforcing material 52 may vary for different composite materials 50. For example, the ratio of matrix material 54 to reinforcing material 52 may be approximately 10:1 to 1:10, 5:1 to 1:5, 3:1 to 1:3, 2:1 to 1:2, or 1:1.

FIG. 5 is an exploded side view of a light composite piston assembly 70, illustrating a piston 36 having a multi-part configuration and a piston rod clamping system 68. Specifically, in the illustrated embodiment, the piston 36 includes two body portions: a first body portion 72 and a second body portion 74, each formed from a lightweight composite material or other lightweight material and coupled to one another by the piston rod clamping system 68. As mentioned above, the lightweight composite material or other lightweight material may be a carbon composite, a plastic, a ceramic, a fiberglass composite, a polyimide, a polyetheretherketone (PEEK), an elastomer such as SA4, or other lightweight composite material, or any combination of these materials. As with the single composite body 42, the first and second body portions 72 and 74 may be formed using a variety of manufacturing processes. For example, the first and second body portions 72 and 74 may be formed using a molding process or a machining process. Furthermore, in the illustrated embodiment, the first and second body portions 72 and 74 are substantially identical. As a result, the manufacturing of the piston 36 may be simplified and streamlined. For example, in embodiments where the first and second body portions 72 and 74 are formed using a molding process, a single mold may be used to form each of the first and second body portions 72 and 74. In other embodiments of the multi-part piston 36, the first and second body portions 72 and 74 may not be identical. In other words, the first and second body portions 72 may have uniquely different configurations.

As shown, each of the first and second body portions 72 and 74 include a base portion 76, an outer lip 78 and an inner hub 80. The outer lip 78 and the inner hub 80 extend axially from the base portion 76 toward a central radial axis 82 of the piston 36. In certain embodiments, the outer lip 78 and the inner hub 80 may each have an annular configuration. Between the outer lip 78 and the inner hub 80 is an annular cavity 84. As will be appreciated, the annular cavity 84 of each of the first and second body portions 72 and 74 provides a lighter weight design of the piston 36. In embodiments where the first and second body portions 72 and 74 are formed using a molding process, the mold used to form the first and second body portions 72 and 74 may be configured to form the annular cavity 84. Alternatively, the annular cavity 84 may be formed by a machining process such as milling or turning.

Each of the first and second body portions 72 and 74 further includes ribs 86 extending between the base portion 76 and the inner hub 80. For example, the ribs 86 may have a linear (e.g., straight) configuration, a spiral configuration, or a combination thereof. That is, each of the ribs 86 may be straight, each of the ribs 86 may be spiraled, or some ribs 86 may be straight and some ribs 86 may be spiraled. The ribs 86 provide additional structural support for the first and second body portions 72 and 74 and the piston 36 as a whole. As with the annular cavity 84, the ribs 86 may be formed with a mold or with a machining process. Each of the first and second body portions 72 and 74 may include 1 to 10, 2 to 8, or 3 to 4 ribs 86.

As mentioned above, the light composite piston assembly 70 includes the piston rod clamping system 68 (e.g., piston rod 90, piston rod nut 94, etc. discussed below) that clamps or holds the components of the piston 36 together. The piston rod clamping system 68 enables the use and assembly of the piston 36 having a multi-part configuration. For example, the piston rod clamping mechanism 68 enables the assembly of the first and second body portions 72 and 74, where the first and second body portions 72 and 74 form the hollow piston 36.

The inner hub 80 of each of the first and second body portions 72 and 74 includes an aperture 88 configured to receive the piston rod 90. Specifically, the aperture 88 extends through inner hub 80 and the base portion 76 of each of the first and second body portions 72 and 74. Furthermore, the aperture 88 includes a recess 92 formed in the base portion 76 of each of the first and second body portions 72 and 74. The apertures 88 and recesses 92 may be formed in the respective first and second body portions 72 and 74 using a machining process such as drilling or using a molding process. The recess 92 formed in the first body portion 72 is configured to receive a piston rod nut 94. Specifically, when the piston assembly 70 is assembled, the piston rod nut 94 is received by the recess 92 of the first body portion 72 and is coupled to the piston rod 90, thereby partially securing the piston rod 90 to the piston 36. In some embodiments, the piston rod nut 94 and the recess 92 formed in the first body portion 72 may have the same or similar geometry. For example, the piston rod nut 94 and/or the recess 92 of the first body portion 72 may have a triangular, rectangular, hexagonal, octagonal, or polygonal shape. Specialized assembly tools may be used to engage with the piston rod nut 94 for tightening or loosening the piston rod nut 94. When the piston rod nut 94 is coupled to the piston rod 90 and disposed within the recess 92 of the first body portion 72, rotation of the piston rod nut 94 may be blocked. Blocking rotation of the piston rod nut 94 may enable the piston rod 90 and the piston rod nut 94 to remain coupled together during operation of the compressor 10.

The recess 92 of the second body portion 74 is configured to receive a piston rod washer 96 (e.g., piston rod cup). When the piston rod assembly 70 is assembled, the piston rod washer 96 is disposed about the piston rod 90 and is disposed within the recess 92 of the second body portion 74, thereby limiting radial movement of the piston rod 90 with respect to the piston 36. As discussed in detail below, when the piston rod 90 and the piston rod nut 94 are coupled to one another, the piston rod 90 and the piston rod nut 94 may axially compress the components of the piston 36 together to form the piston 36.

In the illustrated embodiment, piston ring carrier 46 is disposed between the first and second body portions 72 and 74. When the piston assembly 70 is assembled, the piston ring carrier 46 abuts and is disposed between the outer lips 78 of the first and second body portions 72 and 74. Additionally, when the piston assembly 70 is assembled, the inner hubs 80 of the first and second body portions 72 and 74 abut one another. Specifically, the apertures 88 and the recesses 92 of the respective first and second body portions 72 and 74 will be operatively connected for receiving the piston rod 90 along a central axis 98 of the piston 36.

Figure 6:
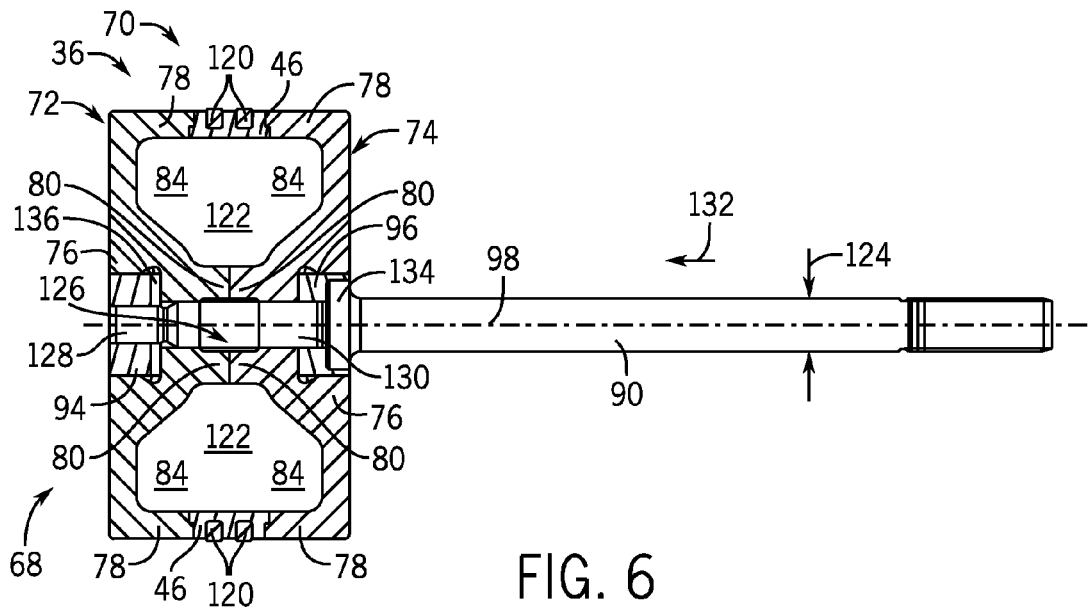
FIG. 6 is a cross-sectional side view of the light composite piston assembly of FIG. 5, in accordance with embodiments of the present disclosure.

FIG. 6 is a cross-sectional side view of the piston assembly 70 of FIG. 4, illustrating the piston assembly 70 assembled with the piston rod clamping system 68. The illustrated embodiment includes similar elements and element numbers as the embodiment shown in FIG. 5. As mentioned above, when the piston assembly 70 is assembled, the piston ring carrier 46 is axially captured between the first and second body portions 72 and 74. Specifically, the piston ring carrier 46 abuts and is axially captured between the outer lips 78 of each of the first and second body portions 72 and 74. In the illustrated embodiment, pistons rings 120 are disposed within the grooves 48 of the piston ring carrier 46. As discussed above, the piston rings 120 serve to create a gas-tight seal between the piston 36 and a piston cylinder in which the piston 36 operates. The piston ring carrier 46 and the first and second body portions 72 and 74 are coupled together to form the piston 36. As mentioned above, the inner hubs 80 of each of the first and second body portions 72 and 74 abut one another. Additionally, the annular cavities 84 of each of the first and second body portions 72 and 74 are joined to form hollow portions 122 of the piston 36. As will be appreciated, in addition to the lightweight material construction, the hollow portions 122 of the piston 36 help to enable a light weight configuration of the piston 36. The light weight configuration of the piston 36 allows the piston 36 to be operated at higher speeds than pistons formed using conventional designs. As a result, the piston cylinder containing the piston 36 may realize a larger flow capacity without increasing the size of the piston cylinder. Additionally, the light weight design of the piston 36 reduces the inertial load of the piston, which may increase the longevity of the piston 36.

As shown, the piston rod 90 is coupled to the piston assembly 70 by the piston rod clamping system 68, which includes the piston rod 90, the piston rod nut 94, and the piston rod washer 96. In certain embodiments, the piston rod 90 has a diameter 124 which may be approximately 10 to 500, 20 to 400, 30 to 300, 40 to 200, or 50 to 100 mm. A first end 126 of the piston rod 90 is coupled to the piston assembly 70. Specifically, the first end 126 is received by the apertures 88 of the first and second body portions 72 and 74 of the piston 36. As mentioned above, the piston rod nut 94 is disposed within the recess 92 of the first body portion 72, and is coupled to a portion 128 of the first end 126 of the piston rod 70. For example, the portion 128 of the piston rod 90 and the piston rod nut 94 may each be threaded and configured to engage with one another. Specifically, when the piston rod nut 94 (e.g., internally threaded nut) is disposed within the recess 92 of the first body portion 72, the piston rod nut 94 is held stationary. In other words, the piston rod nut 94 may have a configuration, such as a polygonal configuration, whereby the piston rod nut 94 may not rotate about the central axis 98 of the piston 36 when the piston rod nut 94 is disposed within the recess 92 of the first body portion 72. Subsequently, the first end 128 of the piston rod 90 (e.g., externally threaded rod) may be placed through the apertures 88 of the first and second body portions 72 and 74, and the piston rod 90 may be rotated about the central axis 98. In this manner, the threads of the portion 128 of the piston rod 90 and the threads of the piston rod nut 94 may engage, thereby coupling the piston rod 90 to the piston rod nut 94.

Similarly, the piston rod washer (e.g., piston rod cup) 96 is disposed about a portion 130 of the first end 126 of the piston rod 70 and within the recess 92 of the second body portion 74 of the piston 36. The piston rod washer 96 may be formed from steel, aluminum, or a soft, light material, and may protect the piston 36 (e.g., the second body portion 94) from the piston rod 90. As the portion 128 of the piston rod 90 is coupled to the piston rod nut 94, e.g., by rotating the piston rod 90 about the central axis 98, the piston rod 90 is translated in a direction 132. As a result, a flange (e.g., shoulder) 134 of the portion 130 of the piston rod 90 axially abuts the piston rod washer (e.g., piston cup) 96, which is disposed in the recess 92 of the second body portion 74. Additionally, a washer 136 (e.g., a steel washer) disposed between the piston rod nut 94 and the first body portion 72 helps distribute a load from the piston rod nut 94 to the piston 36. The piston rod 90 couples the piston rod nut 94, the piston ring 46, the first and second body portions 72 and 74, and the piston rod washer 96 in compression to form the piston 36. As the first and second body portions 72 and 74 are formed from the composite material 50, the first and second body portions 72 and 74 may have an increased capability to withstand compressive forces. As discussed in detail below with respect to FIG. 13, the piston rod 90 may have a variety of compositions to enable coupling to the piston 36. For example, certain portions of the piston rod 90 may have various coatings or surface treatments (e.g., hard coatings, wear resistant coatings, etc.) to enable the threaded engagement between the piston rod 90 and the piston rod nut 94.

Figure 7:
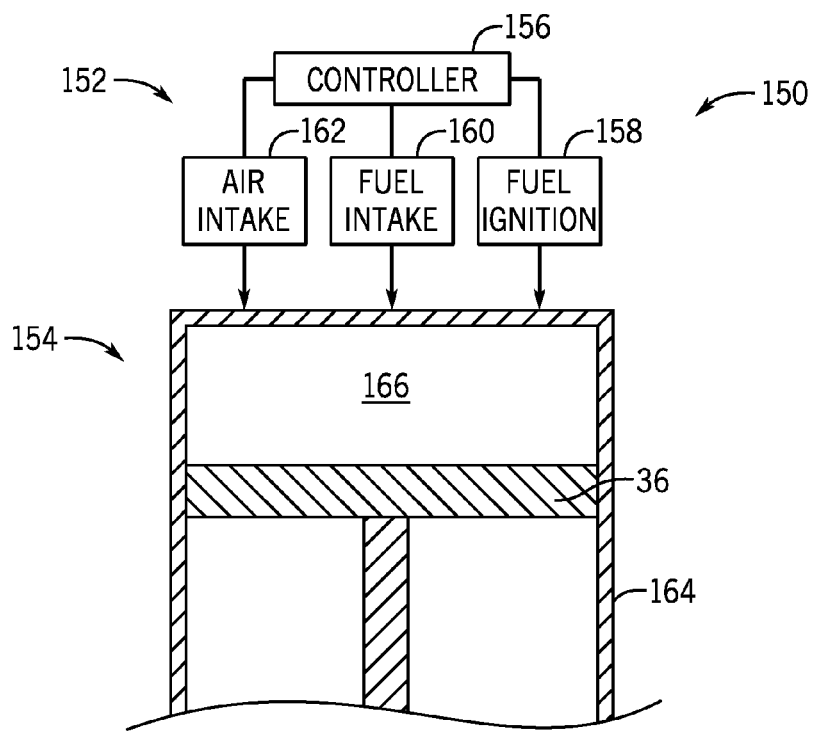
FIG. 7 is a schematic of an exemplary piston cylinder system including a light composite piston, in accordance with embodiments of the present disclosure.

FIG. 7 is a schematic of an exemplary piston cylinder system 150 including a light composite piston 36. As discussed above, the light composite piston 36 may be used in a variety of applications, such as compressors, pumps, and engines. For example, the piston cylinder system 150 of FIG. 7 may be used in a combustion engine. The illustrated embodiment of the piston cylinder system 150 includes a fuel injection system 152 coupled to a combustion chamber 154. The fuel injection system 152 includes a controller 156 coupled to a fuel ignition 158, a fuel intake or supply 160, and an air intake or supply 162. The controller is configured to control the quantity and timing of fuel injection and fuel ignition via the fuel intake 160 and the fuel ignition 158 in conjunction with the quantity and timing of air supply into the combustion chamber 154.

As illustrated, the combustion chamber 154 includes a piston 36 disposed in a cylinder 164. The piston 36 may be an embodiment of the light composite piston 36 described above. For example, the piston 36 may comprise a single composite body 42 formed from a lightweight composite material or other lightweight material. Alternatively, the piston 36 may be formed form first and second body portions 72 and 74 formed from a lightweight composite material or other lightweight material. Other embodiments of the piston 36 may include three or more body portions formed from a lightweight composite material or other lightweight material. As the piston 36 moves upward within the cylinder 164, the piston 36 compresses a combustion volume 166 having the air and eventually fuel from the intakes 162 and 160. For example, the fuel intake 160 may inject the fuel at one or more times during the upward stroke of the piston 36 as the piston approaches a top dead center position. At this point, the fuel air mixture is at an elevated pressure and an elevated temperature due to the compression by the piston 22. At an appropriate timing, the fuel ignition ignites the fuel-air mixture to generate hot pressurized combustion gases, which drive the piston 36 away from the top dead center position.

Figure 8:
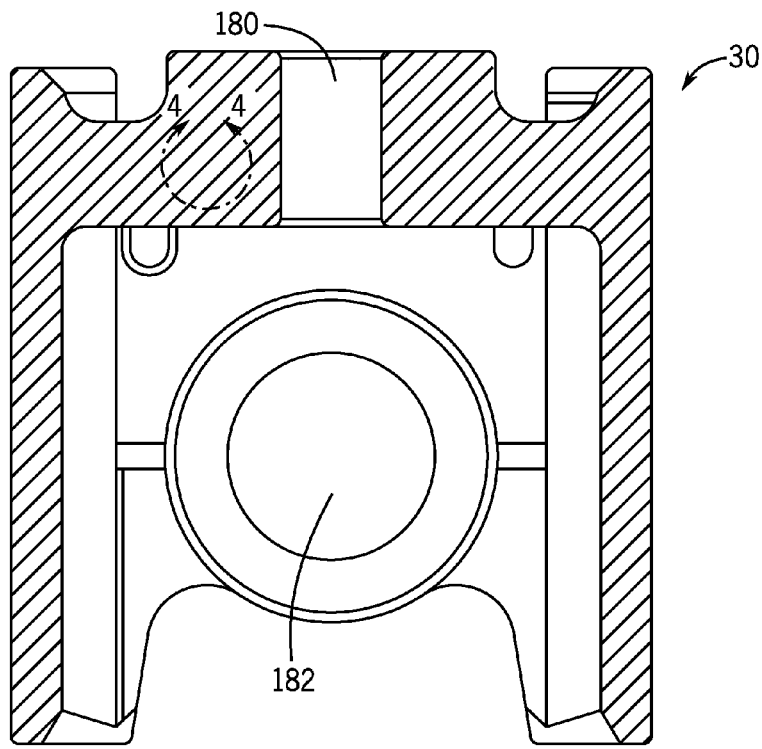
FIG. 8 is a side view of a light composite crosshead, in accordance with embodiments of the present disclosure.

FIG. 8 is a cross-sectional side view of an embodiment of the crosshead 30, which may be formed from a light composite material or other lightweight material. As mentioned above, the crosshead 30 is configured to couple the connecting rod 28 to the piston rod 33, thereby transferring energy from the crankshaft, to the connecting rod 28, to the crosshead 30, to the piston rod 90 and to the piston 36. In the illustrated embodiment, the crosshead 30 has a crosshead body 178 having a single-piece configuration.

In the illustrated embodiment, the crosshead 30 has a first aperture 180 configured to receive the piston rod 90. For example, the piston rod 90 may be coupled to the crosshead 30 within the first aperture 180 using bolts, nuts, pins, or other clamping means. Additionally, the crosshead 30 has a second aperture 182, which may be used to couple the crosshead 30 to the connecting rod 28. Specifically, the second aperture 182 of the crosshead 30 may be aligned with an aperture or opening in the connecting rod 28, and the pin 32 may be disposed within the aperture 182 of the crosshead 30 and the aperture in the connecting rod 28, thereby coupling the crosshead 30 to the connecting 28. In this manner, the crosshead 30 and the connecting rod 28 may pivot relative to one another, while transferring energy from the connecting rod 28 to the piston rod 90.

As mentioned above, the crosshead 30 may be formed form a lightweight composite material or other lightweight material. For example, as mentioned above, the crosshead 30 has a single-piece configuration, and therefore may be formed from a single lightweight composite material or other lightweight material. In other embodiments, the crosshead 30 may have a multi-piece design and may be formed using multiple lightweight and/or lightweight composite materials. The crosshead 30 may be formed from lightweight materials such as a ceramic, a matrix-reinforced material, carbon fibrous materials, a polyimide, a polyetheretherketone (PEEK), an elastomer, or other composite. Additionally, the lightweight crosshead 30 may be formed from using a molding process, dyeing process, or other machining process. As will be appreciated, the lightweight construction of the crosshead 30 may improve the performance of the compressor 10 by enabling the operation of the compressor 10 at faster speeds. Additionally, the longevity and useful life of the crosshead 30 may be improved due to the reduced inertial load of the crosshead 30 and/or improved wear and/or corrosion resistance of lightweight materials, such as ceramics, that may be used to make the crosshead 30.

Figure 9:
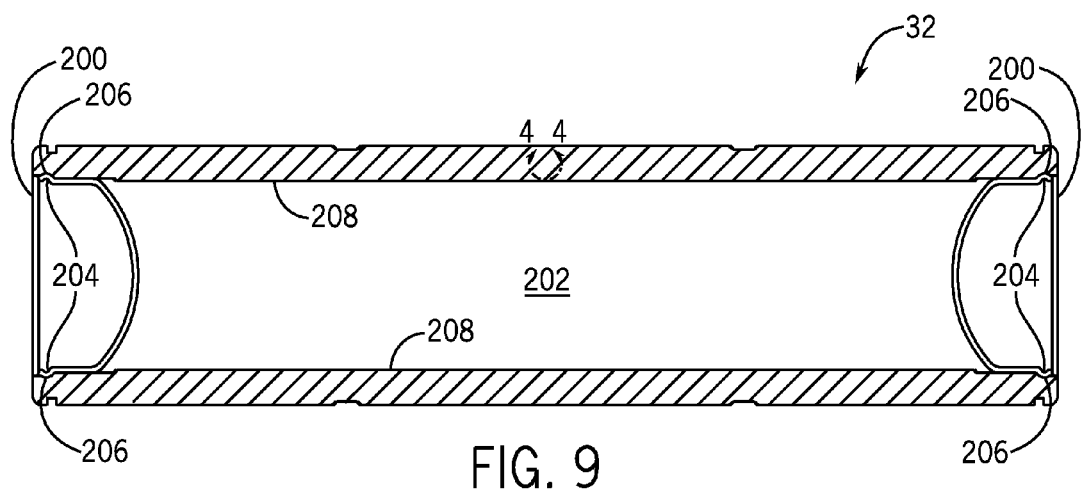
FIG. 9 is a cross-sectional side view of a crosshead pin, in accordance with embodiments of the present disclosure.

FIG. 9 is a cross-sectional side view of an embodiment of the crosshead pin 32, which may be formed from a light composite material or other lightweight material. As shown, the crosshead pin 32 has a cylindrical shape and is configured to be disposed within the second aperture 182 of the crosshead 30. In certain embodiments, the crosshead pin 32 may be formed from a lightweight material, such as a ceramic, a polyimide, a polyetheretherketone (PEEK), an elastomer, a carbon-fibrous composite, matrix-reinforced material, or other composite. The crosshead pin 32 may be formed using a machining process, such as a molding process or dyeing process. Additionally, the crosshead pin 32 includes two caps 200 disposed on either end of the crosshead pin 32, thereby enclosing a cavity 202 formed by the cylindrical shape of the crosshead pin 32. As shown, the caps include indentions 204 (e.g., annular indentions) which engage with recesses 206 formed in an inner surface 208 of the crosshead pin 32. In this manner, the caps 200 may be retained within the cavity 202 of the crosshead pin 32. In certain embodiments, the caps 200 may be formed from a metal, such as steel or aluminum. As will be appreciated, the lightweight construction of the crosshead pin 32 may improve the performance of the compressor 10 by enabling the operation of the compressor 10 at faster speeds.

Figure 10:
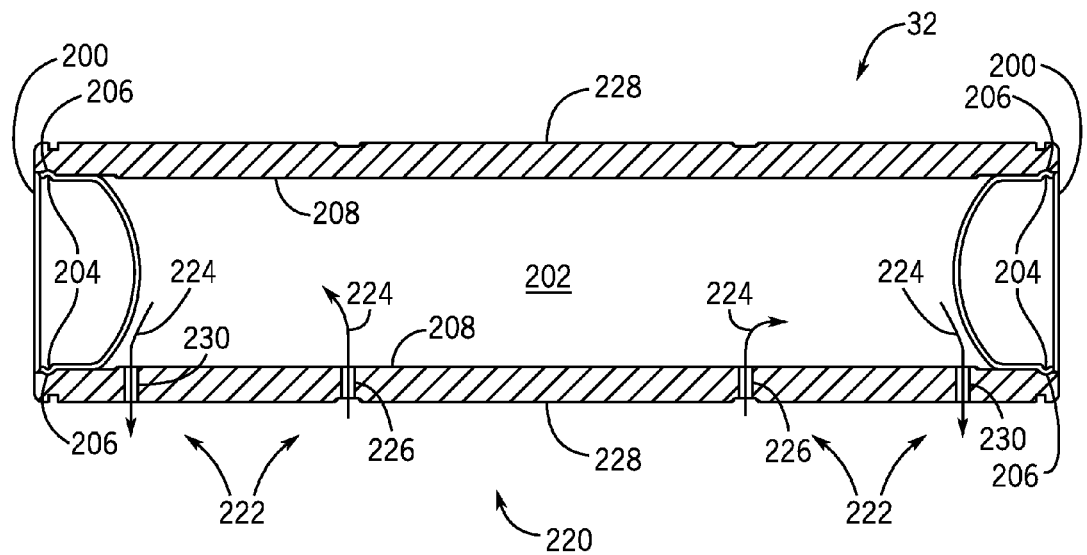
FIG. 10 is a cross-sectional side view of a light composite crosshead pin, in accordance with embodiments of the present disclosure.

FIG. 10 is a cross-sectional side view of an embodiment of the crosshead pin 32. More specifically, the illustrated crosshead pin 32 is configured for use with the crosshead lubrication system 220. The crosshead pin 32 shown in FIG. 10 includes similar elements and element numbers as the embodiment of the crosshead pin 32 shown in FIG. 9.

Additionally, the present embodiment of the crosshead pin 32 includes ports 222 configured to flow a coolant and/or a lubricant, such as oil, represented by reference numeral 224. For example, the crosshead pin 32 includes entry ports 226, which may receive the lubricant 224 from the connecting rod 28 of the compressor 10. More specifically, the lubricant 224 may reach the entry ports 226 from a surface, port, passage, or other portion of the connecting rod 28. As shown, the entry ports 226 extend from an outer surface 228 of the crosshead pin 32 to the inner surface 208 of the crosshead pin 32. As a result, the lubricant 224 flows into the cavity of the crosshead pin 32. While the illustrated embodiment of the crosshead pin 32 includes two entry ports 226 for receiving the lubricant 224 from the connecting rod 28, other embodiments may include any suitable number of entry ports 226 extending from the outer surface 228 to the inner surface 208 of the crosshead pin 32.

Moreover, the crosshead pin 32 also includes two exit ports 230, although other embodiments of the crosshead pin 32 may include other suitable numbers of exit ports 230. From within the cavity 202 of the crosshead pin 32, the lubricant 224 flows through the exit ports 230 to the outer surface 228 of the crosshead pin 32. As mentioned above, when the crosshead pin 32 is disposed within the aperture 182 of the crosshead 30 to couple the connecting rod 28 to the crosshead 30, the crosshead 30 and the connecting rod 28 may pivot relative to one another. As a result, the crosshead pin 32 may move or rotate relative to the crosshead 30, thereby creating a bearing surface between the outer surface 228 of the crosshead pin 32 and an inner surface (inner surface 256 of FIG. 11 below) of the crosshead 30. As will be appreciated, when the lubricant 224 exits the cavity 202 of the crosshead pin 32 through the exit ports 230, the lubricant 224 may flow along the outer surface 228 of the crosshead pin 32 between the crosshead pin 32 and the crosshead 30. In this manner, the lubricant 224 may reduce friction, abrasion, and/or wear between the crosshead pin 32 and the crosshead 30, as the crosshead pin 32 and the crosshead 30 move relative to one another. Furthermore, as discussed in detail below with reference to FIG. 11, when the lubricant 224 exits the cavity 202 of the crosshead pin 32, the lubricant 224 may flow from the exit ports 230 into lubricant ports (lubricant ports 254 of FIG. 11) of the crosshead 30, from which the lubricant 224 may flow to other portions of the crosshead 30.

Figure 11:
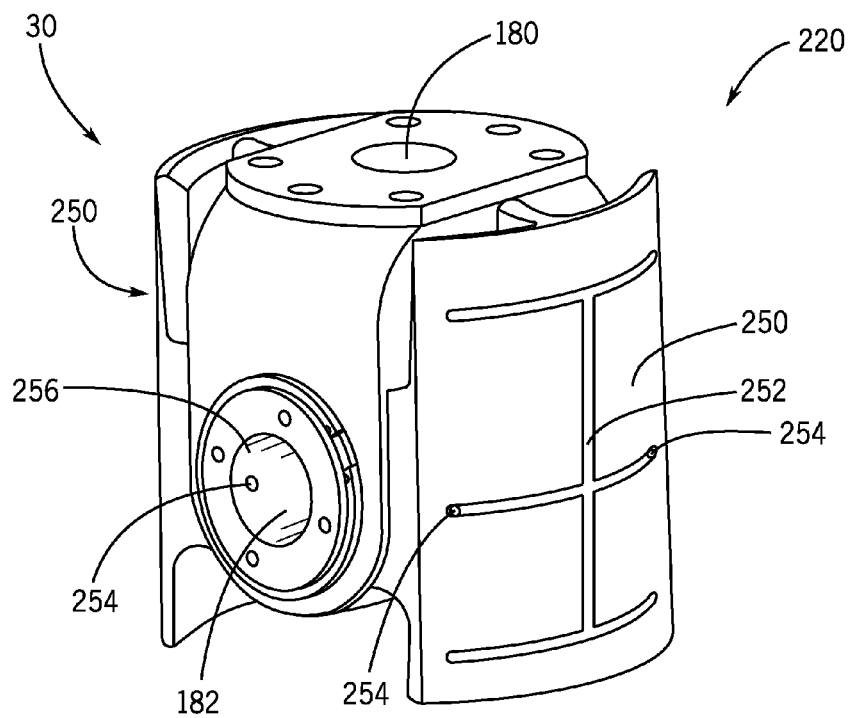
FIG. 11 is a perspective view a light composite crosshead, in accordance with embodiments of the present disclosure.

FIG. 11 is a perspective view an embodiment of the crosshead 30. More specifically, the crosshead 30 is configured for use with the crosshead lubrication system 220. That is, the crosshead 30 may be a component of the crosshead lubrication system 220. As mentioned above, the crosshead lubrication system 220 is configured to transmit a flow of lubricant, such as oil, from a connecting rod (e.g., connecting rods 28 shown in FIG. 2) to various surfaces of the crosshead 30.

In the illustrated embodiment, the crosshead 30 includes outer surfaces 250 having recesses 252. More particularly, the recesses 252 formed in the outer surfaces 250 of the crosshead 30 are configured to receive and flow the lubricant 224, in the manner described below. In certain embodiments, the recesses 252 may be formed in the outer surfaces 250 by machining or molding. As will be appreciated, the outer surfaces 250 of the crosshead 30 are configured to abut and translate along the crosshead guides 34 of the compressor 10 during operation of the compressor 10. Therefore, as the lubricant 224 flows within the recesses 252 formed in the outer surfaces 250, the lubricant 224 may reduce friction, abrasion, and/or wear between the crosshead 30 and the crosshead guides 34, as the crosshead 30 moves along the crosshead guides 34.

As shown, the recesses 252 are indentions, canals, depressions, cavities, or other similar formations that the lubricant 224 may flow within or along. Additionally, the shape, configuration, or design of the recesses 252 in the outer surfaces 250 may vary. Furthermore, the recesses 252 are fluidly coupled to one or more ports 254 formed in the crosshead 30. More specifically, the ports 254 extend from one of the outer surfaces 250 (e.g., one of the recesses 252), and through the crosshead 30 to the aperture 182 of the crosshead 30. More specifically, the ports 254 extend to the inner surface 256 of the crosshead 30. As discussed in detail above, the crosshead pin 32 may move (e.g., rotate) relative to the crosshead 30, thereby creating a bearing surface between the outer surface 228 of the crosshead pin 32 and the inner surface 256 of the crosshead 30. Moreover, as the crosshead pin 32 moves relative to the crosshead 30, the exit ports 230 of the crosshead pin 32 may periodically align with the ports 254 of the crosshead 30. In this manner, the lubricant 224 exiting the cavity 202 of the crosshead pin 32 through the exit ports 230 may pass into the ports 254 formed in the crosshead 30. Thereafter, the lubricant 224 may travel through the ports 254 to the recesses 252 formed in the outer surfaces 250 of the crosshead 30. As the lubricant 224 flows within the recesses 252, the lubricant 224 may reduce friction, abrasion, and/or wear between the crosshead 30 and the crosshead guides 34, as the crosshead 30 moves along the crosshead guides 34.

Figure 12:
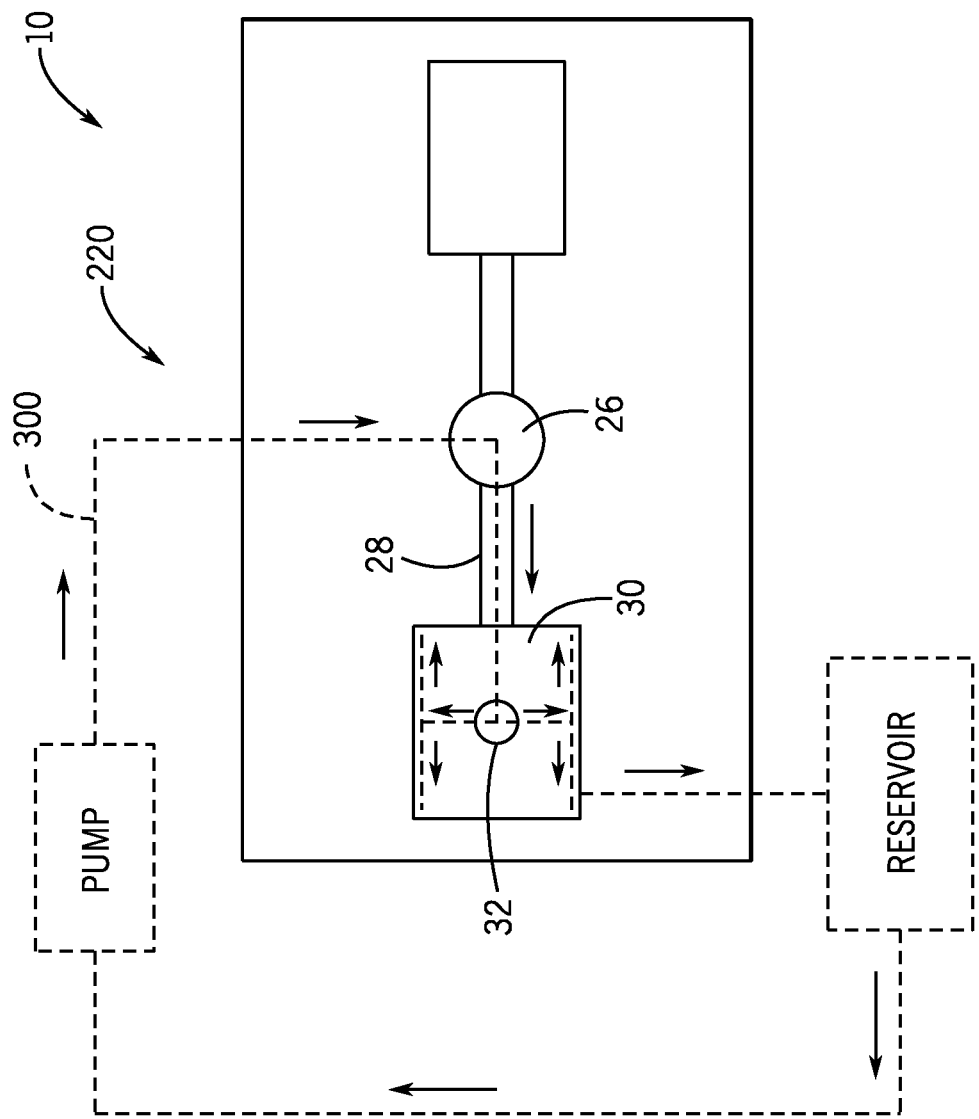
FIG. 12 is a schematic of a compressor having a crosshead lubrication system, in accordance with embodiments of the present disclosure.

FIG. 12 is a schematic of the compressor 10 having the crosshead lubrication system 220, illustrating a flow path 300 of the lubricant 224. As will be appreciated, the flow path 300 of the lubricant 224 may be vary for different embodiments of the crosshead lubrication system 220. As mentioned above the lubricant 224 flows from the connecting rod 28 to the crosshead pin 32. That is, the lubricant 224 enters the crosshead pin 32 through the entry ports 226 of the crosshead pin 32. Thereafter, the lubricant 224 exits the crosshead pin 32 (e.g., the cavity 202 of the crosshead pin 32) through the exit ports 230 and enters the crosshead 30 through the ports 254 of the crosshead 30. The lubricant 224 reaches the recesses 252 formed in the crosshead 30 and lubricants the bearing surfaces between the crosshead 30 and the crosshead guides 34. After lubricating the bearing surfaces, the lubricant 224 may be collected in a reservoir 302 of the crosshead lubrication system 220. The lubricant 224 may then continue along the flow path 300 to be reused for lubrication of the crosshead 30. For example, in certain embodiments, a pump 304 may be used to circulate the flow of the lubricant 224 within the crosshead lubrication system 200. Other embodiments of the crosshead lubrication system 220 may include additional components (e.g., along the flow path 300), such as sumps, filters, and so forth.

In certain embodiments, the crosshead 30 and the crosshead pin 32 having the crosshead lubrication system 220 may be formed from the lightweight materials described above (e.g., lightweight composite materials). For example, the crosshead 30 and/or the crosshead pin 32 may be formed with the composite material 50 described above. That is, the composite material 50 may have the reinforcing material 52 distributed within the matrix material 54. For example, the matrix material may be a plastic, polymer, polyester, epoxy, polyimide, polypropylene, a polyetheretherketone (PEEK), or other matrix material. Additionally, the reinforcing material may be fibers or other particles, such as carbon, glass, ceramics, or other reinforcing material. Moreover, the crosshead 30 and/or the crosshead pin 32 having the crosshead lubrication system 220 may be formed from other lightweight materials, such as a carbon composite, a plastic, a polyetheretherketone (PEEK) material, polyimide, an elastomer such as SA4, a ceramic, a fiberglass composite, or other lightweight composite material.

Figure 13:
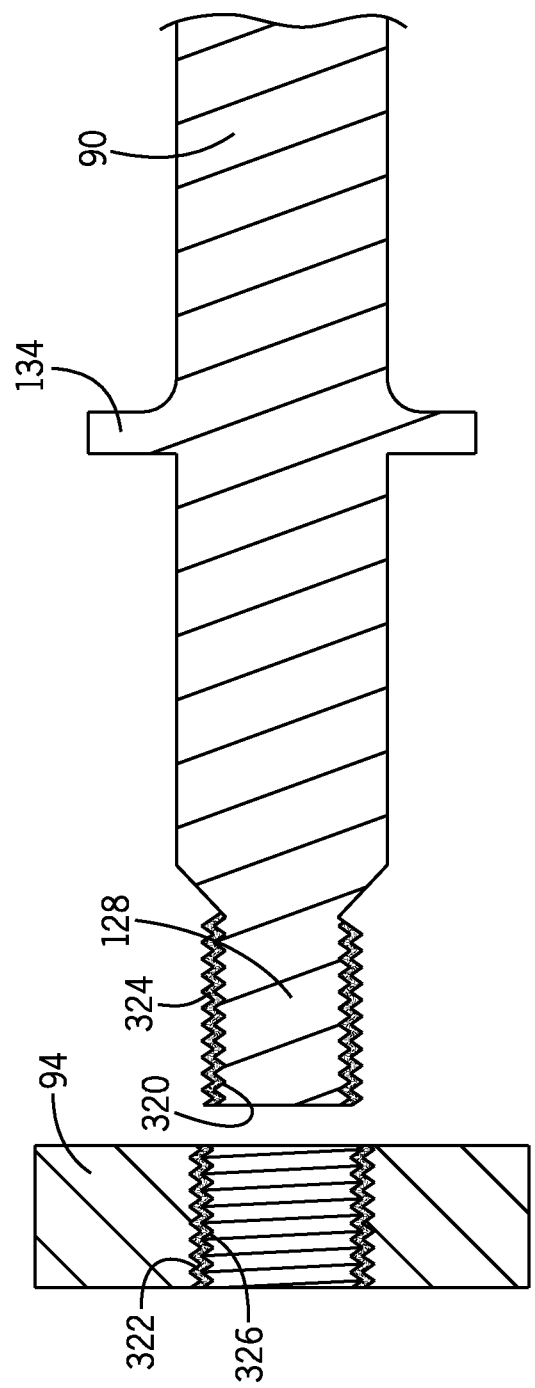
FIG. 13 is a schematic of a piston rod and a piston assembly nut of a piston rod clamping system, in accordance with embodiments of the present disclosure.

FIG. 13 is a schematic of the piston rod 90, illustrating a material composition of the piston rod 90. As discussed in detail above, the piston rod 90 couples with the piston rod nut 94 to assemble the piston 36 by axially compressing and retaining the components of the piston 36 (e.g., the first and second body portions 72 and 74 and piston ring carrier 46) together. Specifically, the piston rod 90 and the piston rod nut 94 engage in a threaded connection with one another. As the portion 128 of the piston rod 90 is coupled to the piston rod nut 94, e.g., by rotating the piston rod 90 about the central axis 98, the flange or shoulder 134 of the piston rod 90 axially abuts the piston rod washer (e.g., piston cup) 96, which is disposed in the recess 92 of the second body portion 74. Additionally, the piston rod nut 94 axially abuts the washer 136 within the recess 92 of the first body portion 72. As a result, the piston rod washer 96 and the washer 136 cooperatively compress (e.g., in an axial direction) the first and second body portions 72 and 74 and the piston ring carrier 46 together to form the piston 36. To enable the threaded engagement between the piston rod 90 and the piston rod nut 94, the portion 128 of the piston rod 90 includes threads 320 (e.g., male or external threads), which engage with corresponding threads 322 (e.g., female or internal threads) of the piston rod nut 94.

As mentioned above, the piston rod 90 may be formed from a variety of materials. For example, the piston rod 90 may be formed from steel. In other embodiments, the piston rod 90 may be formed from the composite material 50. In such an embodiment, the lightweight construction of the piston rod 90 may further improve the dynamics of the compressor 10 (or other machine), thereby further improving the efficiency of the compressor 10. In embodiments where the piston rod 90 is formed from a composite material, the portion 128 of the piston rod 90 may include a coating or surface treatment 324. For example, the threads 320 of the piston rod 90 may have the coating or surface treatment 324, such as steel, tungsten carbide, or other coating having a hardness and/or wear resistance that is greater (e.g., at least 1.5, 2, 3, 4, 5, 6, 7, 8, 9, 10 times greater) than the piston rod 90 and/or piston rod nut 94. For example, the coating or surface treatment 324 may be a metallic material, a ceramic material, or other hard material.

The coating or surface treatment 324 may improve the strength and hardness of the threads 320. As a result, the threaded connection between the piston rod 90 and the piston rod nut 94 may be improved. Similarly, the threads 322 of the piston rod nut 94 may include a coating or surface treatment 326. The coating or surface treatment 326 of the piston rod nut 94 may be the same or different than the coating or surface treatment 324 of the piston rod 90.

The lightweight construction and configurations of the piston 36, crosshead 30, crosshead pin 32, piston rod 90, and associated components is beneficial for a number of reasons. As discussed above, the lightweight configuration of the piston 36 enables the piston 36 to move within the piston cylinder 164 at faster speeds than a piston 36 not having a lightweight configuration. As a result, the power output of the piston cylinder system 150, e.g., the power transferred to a crankshaft, increases in an engine. Furthermore, the increase in power output due to the lightweight construction of the piston 36 may be realized without increasing the size of the piston cylinder 164. The lightweight design of the piston 36 further reduces the inertial load of the piston 36, which may increase the longevity or useful life of the piston 36. Additionally, the reduced inertial load of the piston 36 may increase the useful life of other moving components in the piston cylinder system 150, such as bearings, rings, bushings, and so forth.

Moreover, the lightweight configuration of the crosshead 30 enables the crosshead 30 to move within the compressor 10 or other machine at faster speeds than a crosshead 30 not having a lightweight configuration. As a result, the power output of the compressor 10, e.g., the power transferred to a crankshaft, increases. Furthermore, the increase in power output due to the lightweight construction of the crosshead 30 may be realized without increasing the size of the piston cylinder 164. The lightweight design of the crosshead 30 further reduces the inertial load of the crosshead 30, which may increase the longevity or useful life of the crosshead 30. Additionally, the reduced inertial load of the crosshead 30 may increase the useful life of other moving components in the compressor 10, such as bearings, rings, bushings, and so forth.

Furthermore, the crosshead lubrication system 220 enables the flow and distribution of lubricant 224 from the connecting rod 28 of the compressor 10 to the crosshead 30 and the crosshead pin 32. More specifically, the lubricant 224 may flow through ports (e.g., ports 226, 230, and 254) formed in the crosshead pin 32 and the crosshead 30 and through the recesses 252 formed in the outer surfaces 250 of the crosshead 30. As a result, abrasion, wear, and/or friction may be reduced between the crosshead 30, the crosshead pin 32, and the crosshead guides 34 as the compressor 10 operates. In other words, as the crosshead pin 32, the crosshead 30, and the crosshead guides 34 rotate, translate, or move relative to one another, abrasion, friction, and/or wear among the components may be reduced. Additionally, the crosshead 30 and the crosshead pin 32 having the crosshead lubrication system 220 may also have one or more of the lightweight configurations described above.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A system, comprising:
a piston rod comprising a piston collar, wherein the piston collar radially extends relative to a longitudinal axis of the piston rod beyond an outermost diameter of the piston rod;
a piston rod nut coupled to the piston rod; and
a piston body, comprising:
a first body portion comprising a first inner hub;
a second body portion comprising a recess and a second inner hub, wherein the first body portion and the second body portion are physically separate; and
a piston ring carrier,
wherein respective outer lips of the first body portion and the second body portion capture the piston ring carrier, the respective outer lips extend in an axial direction relative to a central axis of the piston body, axial end faces of the piston ring carrier axially abut respective axial end faces of the respective outer lips of the first and second body portions, and the piston collar and the piston rod nut capture the first and second body portions, and wherein when the piston collar and the piston rod nut capture the first and second body portions the piston collar is disposed within the recess and the first inner hub and the second inner hub abut each other at an axial location relative to the longitudinal axis centrally located within the piston ring carrier.

2. The system of claim 1, wherein the piston rod is made of a composite material, wherein the composite material comprises a reinforcing material distributed in a matrix material.

3. The system of claim 2, wherein the piston rod comprises a first threaded portion, the piston rod nut comprises a second threaded portion, and the first and second threaded portions are engaged with one another.

4. The system of claim 3, wherein the first threaded portion comprises a surface treatment, wherein the surface treatment comprises a ceramic material, a metallic material, or other composite material.

5. The system of claim 1, wherein the first and second body portions are made of a composite material, wherein the composite material comprises a reinforcing material distributed in a matrix material, and wherein the piston ring carrier is made of a metallic material.

6. The system of claim 1, wherein the first body portion is hollow and reinforced with a first plurality of ribs, and the second body portion is hollow and reinforced with a second plurality of ribs, and wherein the first body portion, the second body portion, and an inner surface of the piston ring carrier together define a common hollow portion within the piston body.

7. A method, comprising:
extending a piston rod through a first aperture of a first body portion of a piston and a second aperture of a second body portion of the piston, wherein the first and second body portions of the piston are physically separate;
coupling a piston rod nut to the piston rod;
disposing a piston rod cup within a first recess of the piston, wherein the piston rod cup comprises a body and an outer lip axially extending from the body, and the body and the outer lip define a second recess;
abutting a collar of the piston rod against the piston rod cup so that an entirety of the collar of the piston rod is disposed within the second recess; and capturing the first and second body portions of the piston axially between the piston rod nut and the collar of the piston rod, wherein the collar of the piston rod radially extends relative to a longitudinal axis of the piston rod beyond an outermost diameter of the piston rod, and wherein capturing the piston between the piston rod nut and the collar of the piston rod comprises capturing a piston ring carrier axially between respective outer lips of the first body portion of the piston and the second body portion of the piston, the respective outer lips extend in an axial direction relative to a central axis of the piston, and axial end faces of the piston ring carrier axially abut respective axial end faces of the respective outer lips of the first and second body portions.

8. The method of claim 7, comprising disposing the piston rod nut within a third recess of the piston.

9. The method of claim 7, wherein coupling the piston rod nut to the piston rod comprises engaging a first threaded portion of the piston rod with a second threaded portion of the piston rod nut.

10. The method of claim 7, wherein the first and second body portions are made of a composite material, wherein the composite material comprises a reinforcing material distributed in a matrix material.

11. A system, comprising:
- a piston having a first body portion physically separate from a second body portion;
- a piston ring carrier;
- a piston clamping system, comprising:
  - a piston rod comprising a piston rod collar, wherein the piston collar radially extends relative to a longitudinal axis of the piston rod beyond an outermost diameter of the piston rod, wherein the piston collar is configured to be disposed within a first recess of a piston;
  - a piston rod cup configured to be disposed between the piston rod collar and the piston and within the first recess of the piston, wherein the piston rod cup comprises a body and an outer lip axially extending from the body, and the body and the outer lip define a second recess, and wherein the piston rod collar is configured to be disposed in its entirety within the second recess; and
  - a piston rod nut coupled to the piston rod, wherein the piston clamping system is configured to capture the piston axially between the piston rod nut and the piston rod collar, and wherein when the piston clamping system captures the piston between the piston rod nut and the piston rod collar of the piston rod the piston clamping system is configured to capture the piston ring carrier axially between respective outer lips of the first body portion of the piston and the second body portion of the piston, the respective outer lips extend in an axial direction relative to a central axis of the piston, and axial end faces of the piston ring carrier axially abut respective axial end faces of the respective outer lips of the first and second body portions.

12. The system of claim 11, wherein the piston rod has a first threaded portion, the piston rod nut has a second threaded portion, and the first and second threaded portions are engaged with one another.

13. The system of claim 12, wherein the first threaded portion comprises a surface coating, wherein the surface coating is different from the first composite material.

14. The system of claim 13, wherein the surface coating is a metallic material, a ceramic material, or other composite material.

15. The system of claim 11, wherein the piston rod is made of a first composite material, and wherein the first composite material comprises a first reinforcing material distributed in a first matrix material, and wherein the piston is made of a second composite material, wherein the second composite material comprises a second reinforcing material distributed in a second matrix material.

* * * * *